Patented Feb. 2, 1926.

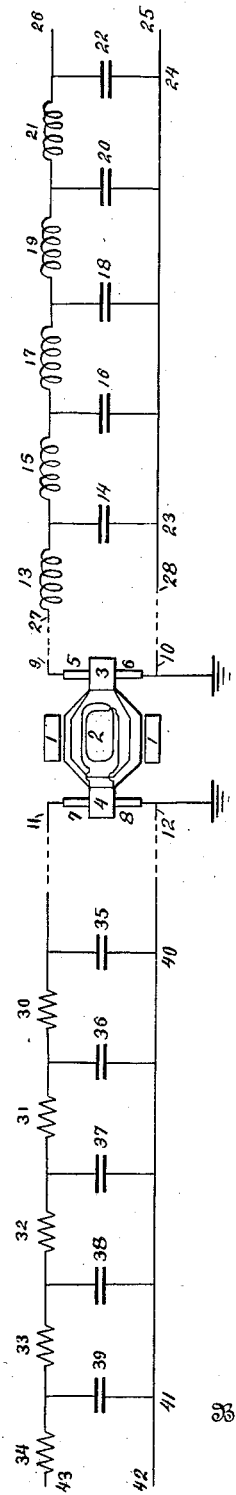

1,571,458

UNITED STATES PATENT OFFICE.

MICHAEL I. PUPIN, OF NORFOLK, CONNECTICUT, ASSIGNOR TO WESTINGHOUSE ELECTRIC & MANUFACTURING COMPANY, OF EAST PITTSBURGH, PENNSYLVANIA, A CORPORATION OF PENNSYLVANIA.

ELECTROMAGNETIC PRODUCTION OF DIRECT CURRENT WITHOUT FLUCTUATIONS.

Application filed December 31, 1915. Serial No. 69,566.

*To all whom it may concern:*

Be it known that I, MICHAEL I. PUPIN, a citizen of the United States, and residing at Norfolk, county of Litchfield, State of Connecticut, have invented certain new and useful Improvements in Electromagnetic Production of Direct Current Without Fluctuations; and I do hereby declare the following to be a full, clear, and exact description of the invention, such as will enable others skilled in the art to which it appertains to make and use the same.

My invention relates to an improvement in the construction and operation of direct-current electromagnetic generators and consists in supplying means for wiping out fluctuations in the voltage and current produced by the action of commutator bars of such generators. As is well known the voltage produced by a dynamo-electric direct-current generator fluctuates whenever the brushes pass from one commutator bar to the next one. The result of this action is that the voltage and current produced by such a generator is the resultant of a constant voltage or current and an alternating or pulsating one superposed upon it. The frequency of the alternating voltage is equal to the frequency of commutation. Thus, a machine having one hundred commutator sections and rotating 30 times per second will have a frequency of commutation equal to 3000. The voltage generated by this machine will consist of a constant electromotive force with an alternating electromotive force of frequency 3000 superposed upon it. If the current of such a machine is allowed to pass through a suitable pilot conductor such, as hereinafter described, then the pilot conductor will completely wipe out the alternating electromotive force and the electromotive force delivered by the generator to the receiving apparatus will be as constant as that generated by a storage battery or an ordinary galvanic battery.

The diagrammatic drawing which forms a part of this specification represents, for the purpose of illustrating various characteristics and applications of the invention, a dynamo-electric direct-current generator having an armature with two commutators and associated pilot conductors, particularly suitable for use in wireless wave transmission systems.

From this drawing and the following description, those skilled in the art will have no difficulty in understanding the more general applications and possibilities of the invention.

In the drawing the direct-current generator has a field 1, and an armature 2 the windings of which are connected to the commutators 3 and 4 to produce at the commutator 3 a relatively large current and small electromotive force and at the commutator 4 a relatively small current and large electromotive force. From the brushes 5 and 6 of commutator 3 connecting wires 9 and 10 lead to the terminals 27 and 28 of a pilot conductor consisting of several sections made up of approximately equal inductances 13, 15, 17, 19, 21 ... connected in series and approximately equal capacities 14, 16, 18, 20, 22 ... connected in parallel by the short circuiting wire 23, 24.

Suppose that each of the commutators has 100 sections and that the speed of revolution is 30 revolutions per second. The electromotive force generated will be a constant electromotive force with a periodic electromotive force superposed upon it. The frequency of the fundamental of this periodic electromotive force will be 3000 P. P. S. If the inductance and capacity of each element of the pilot conductor above referred to are so adjusted that their reactions are equal at a frequency of 1000 P. P. S., that is if they are adjusted to a frequency which is substantially less than one-half the frequency of the fundamental of the periodic electromotive force, then this pilot conductor will wipe out the fluctuations of frequency 3000 P. P. S. or more, if the pilot conductor has a sufficiently large number of sections. Five sections will be found to be quite sufficient. The voltage delivered at 25, 26 will be constant as far as can be detected by a telephone.

This type of pilot conductor is particularly suitable when the current is large and the electromotive force is small, and for the purpose of increasing the inductance without increasing the resistance it is desirable that the inductance coils should have iron cores. These cores should, however, have suitable air gaps to prevent the magnetic flux in the iron from rising to high values, in which case the permeability for the small alternating currents produced by the fluctuations would be very small and very irregular. A generator of suitable capacity and provided with this type of pilot conductor is well adapted to replace the storage batteries which are used today to heat the filaments in vacuum tubes employed in wireless telegraphy.

When a generator is to give small current and large electromotive force to a consuming device which has high resistance then the inductances in the pilot conductor of the first type may be replaced by resistances. Such pilot conductor is herein illustrated, connected by the connecting wires 11 and 12 to the brushes 7 and 8 of the commutator 4, which delivers a relatively small current and large electromotive force. This artificial cable has approximately equal resistances 30, 31, 32, 33, 34 . . . connected in series and approximately equal capacities 35, 36, 37, 38, 39 . . . connected in parallel by the short circuiting wire 40, 41. The resistance and capacity of each section and the number of sections should be so chosen, as to give the cable the required attenuation power for the commutation frequency. For effective results this attenuation power should be not less than four for the commutation frequency of the generator. With such an arrangement the fluctuations in the electromotive force at the brushes 5, 6 will be entirely wiped out and the voltage delivered at 42, 43 will be constant as far as can be detected by a telephone.

A generator delivering relatively small current and large electromotive force, and thus associated with an artificial cable, is well adapted to replace the electric batteries used today in wireless telegraphy for maintaining the thermionic current in vacuum tubes.

A machine like that shown in the drawing, having two commutators and two associated pilot conductors, is well adapted to replace both of the batteries which are used today for heating the filaments and for exciting the vacuum tube relays and amplifiers in wireless wave transmission systems.

As will be apparent to those skilled in the art, the pilot conductor shown associated with the commutator 4 is aperiodic since the unit sections of which it is composed are not capable of sustaining local oscillations, that is, they have no natural period of oscillation; and the pilot conductor shown associated with the commutator 3 may be made aperiodic, or practically so, by properly proportioning the resistance of the inductance coils 13, 15, etc. For the purposes of the present invention the aperiodic pilot conductors are preferable to those which have natural periods because impulse excitation due to sudden variation on the commutator does not set up in them objectionable oscillations.

It will be understood from the theory of action of the pilot conductors described herein, that the higher the commutation frequency the easier it is to construct a pilot conductor which will attenuate the fluctuations in the electromotive force delivered to the consuming device by such a machine. Such generators when of small output have usually, in the present day practice, a small commutation frequency. The practice of this invention requires for its efficiency commutators of a large number of commutator sections, much larger than is the usual practice today in machines of small output; and in utilizing the invention the generators should be constructed accordingly.

In place of a generator having a commutator producing uni-directional periodically fluctuating electromotive force and current it is, of course, possible to use a generator of alternating current in connection with some sort of a rectifying device other than a commutator, as, for example, the well known mercury rectifier; and such arrangements are intended to be included when, in the specification and claims, I refer to an electric generator producing uni-directional periodically fluctuating electromotive force and current.

What I claim is:

1. A dynamo electric generator producing uni-directional periodically fluctuating electromotive force and current, in series with an aperiodic pilot conductor made up of unit sections containing reactance and resistance so adjusted as to afford high attenuation power for fluctuations in the generated electromotive force and current.

2. A direct current dynamo electric generator having a commutator and collector brushes, in series with an aperiodic pilot conductor made up of unit sections containing reactance and resistance so adjusted as to have a high attenuation power for fluctuations of the frequency of commutation.

3. A direct current dynamo electric generator having a commutator of a relatively large number of commutator segments and designed for rotation at such a speed that the commutation frequency is relatively considerably higher than in ordinary commercial machines of similar type, in series with a pilot conductor made up of unit sections containing reactance and resistance so adjusted as to afford high attenuation power for fluctuations of the frequency of commutation.

4. A direct current dynamo electric generator of the commutator type having a commutation frequency greater than 2000 P. P. S. in series with a pilot conductor made up of unit sections containing reactance and resistance so adjusted as to afford high attenuation power for fluctuations of the frequency of commutation.

5. A direct current dynamo electric generator having a commutator of a relatively large number of commutator segments and designed for rotation at such a speed that the commutation frequency is relatively much higher than in ordinary commercial machines of similar type, collector brushes operatively associated with said commutator and an aperiodic pilot conductor, electrically connected to said brushes and made up of unit sections of reactance and resistance so adjusted as to have a high attenuation power for fluctuations of the frequency of commutation, each unit section including a resistance electrically connected in series relation with said brushes and a reactance electrically connected in parallel relation with said brushes.

6. A dynamo electric generator producing uni-directional periodically fluctuating electromotive force and current, in series with an aperiodic pilot conductor made up of unit sections of reactance and resistance so adjusted as to afford high attenuation power for fluctuations of the frequency present in the generated electromotive force and current, each unit section comprising a resistance connected in series relation with said electromotive force and a reactance connected in parallel relation with said electromotive force.

In testimony whereof I affix my signature.

MICHAEL I. PUPIN.